(12) United States Patent  
Streuber

(10) Patent No.: US 8,668,853 B2  
(45) Date of Patent: Mar. 11, 2014

(54) METHOD FOR MANUFACTURING A THREE-DIMENSIONALLY DEFORMABLE, SHEET-LIKE REINFORCING STRUCTURE

(75) Inventor: Fritz Michael Streuber, Hiddenhausen (DE)

(73) Assignee: ESC Extended Structured Composites GmbH & Co. Kg, Hiddenhausen (DE)

( * ) Notice: Subject to any disclaimer, the term of this patent is extended or adjusted under 35 U.S.C. 154(b) by 600 days.

(21) Appl. No.: 12/742,062

(22) PCT Filed: Nov. 8, 2007

(86) PCT No.: PCT/EP2007/062099  
§ 371 (c)(1),  
(2), (4) Date: May 7, 2010

(87) PCT Pub. No.: WO2009/059642  
PCT Pub. Date: May 14, 2009

(65) Prior Publication Data  
US 2010/0291335 A1    Nov. 18, 2010

(51) Int. Cl.  
*B28B 7/14*    (2006.01)

(52) U.S. Cl.  
USPC ............ 264/163; 264/118; 264/319

(58) Field of Classification Search  
USPC .................. 264/163, 319, 118  
See application file for complete search history.

(56) References Cited

U.S. PATENT DOCUMENTS

| 3,605,534 A | | 9/1971 | Barr |
| 3,841,958 A | * | 10/1974 | Delorme ............... 428/117 |
| 5,380,392 A | | 1/1995 | Imamura et al. |
| 6,030,483 A | * | 2/2000 | Wilson ............... 156/292 |

FOREIGN PATENT DOCUMENTS

| EP | 1398143 A1 | 3/2004 |
| WO | 9810919 A2 | 3/1998 |
| WO | 0168329 A1 | 9/2001 |
| WO | 2006036072 A1 | 4/2006 |

OTHER PUBLICATIONS

European Patent Office, International Search Report and Written Opinion of the International Searching Authority, report, Jan. 14, 2009, pp. 1-10, the Netherlands (Europe).

* cited by examiner

*Primary Examiner* — Dimple Bodawala  
*Assistant Examiner* — Robert J Grun  
(74) *Attorney, Agent, or Firm* — Middleton Reutlinger; John F. Salazar; Eric L. Johnson

(57) ABSTRACT

A method for manufacturing a three-dimensionally deformable, sheet-like reinforcing structure, wherein material attenuations (3) are incorporated into a sheet-like, cellular base material, distributed over an area of the base material, by means of cutting or sawing, said material attenuations (3) sub-dividing the base material into a plurality of material cells (1) which are delineated from each other by the material attenuations (3) but are still connected to each other.

15 Claims, 4 Drawing Sheets ered with reinforcing structures or also a non-reinforced foamed plastic. The invention also relates to a reinforcing structure manufactured in accordance with the method, and to its use for manufacturing a composite material, a "composite", for which the reinforcing structure serves as a core material.

METHOD FOR MANUFACTURING A THREE-DIMENSIONALLY DEFORMABLE, SHEET-LIKE REINFORCING STRUCTURE

CROSS-REFERENCE TO PRIOR APPLICATION

This application is a national stage filing (35 U.S.C. 371) of PCT/EP2007/062099, filed on 8 November 2007.

FIELD OF THE INVENTION

The invention relates to a method for manufacturing a three-dimensionally deformable, sheet-like reinforcing structure from a likewise sheet-like, cellular base material. The base material can in particular be a foamed plastic which is reinforced with reinforcing structures or also a non-reinforced foamed plastic. The invention also relates to a reinforcing structure manufactured in accordance with the method, and to its use for manufacturing a composite material, a "composite", for which the reinforcing structure serves as a core material.

BACKGROUND OF THE INVENTION

Cellular reinforcing structures and their use as core materials of composites is known from WO 98/10919 A2. The reinforcing structures are arranged between covering layers of the respective composite in a sandwich construction, for manufacturing light but nonetheless rigid composites. The reinforcing structures serve as spacers for the covering layers and increase the bending and buckling resistance of the composites. In order to be able to fixedly connect the covering layers of a composite, between which a reinforcing structure is inserted, to each other by means of a joiner, for example by means of an adhesive or synthetic resin, a honeycombed reinforcing structure is used comprising hexagonal material cells and thin bridges which connect them to each other. The joiner penetrates the cavities of the reinforcing structure between the material cells in the region of the bridges, such that at least in the region of the cavities, a material connection to the covering layers is guaranteed. The structuring into material cells and connecting bridges provides the reinforcing structure with a flexibility such as is needed for manufacturing three-dimensionally deformed composites.

However, producing the cavities or other types of material attenuations to the required precision and a desirable efficiency is problematic. Precisely incorporating the material attenuations, for example by means of milling, laser treatment or water jet treatment, is very time-consuming and therefore cost-intensive.

SUMMARY OF THE INVENTION

It is an object of the invention to precisely and efficiently manufacture reinforcing structures of the type cited.

The subject of the invention is a method for manufacturing a three-dimensionally deformable, sheet-like reinforcing structure, wherein material attenuations are incorporated or machined or worked into a sheet-like, cellular base material, distributed over the area of the base material, said material attenuations sub-dividing the base material into a plurality of material cells which are delineated from each other by the material attenuations but are still connected to each other. The material cells are formed by the cellular base material. The material attenuations are preferably incorporated in a regular distribution, such that a correspondingly regular distribution of the material cells and thus structuring of the reinforcing structures is obtained. The material cells preferably each exhibit the same shape and size. The same preferably applies to the material attenuations. The material cells can in particular be polygons, preferably equilateral polygons. They are preferably hexagonal in a top view onto the reinforcing structure.

When incorporating the material attenuations in a batch operation, the base material can be provided in the form of board material which can in particular be plate-like or, in more flexible boards, also mat-like. Flexible base material can also be provided with the material attenuations as a web product in a continuous method. The base material can exhibit a thickness of a few millimetres, for example at least 5 mm, and a thickness of up to a few centimetres, preferably at most 20 mm. The cellular material can have a predominantly open porosity, or more preferably a closed porosity, in order to prevent water or even moisture from entering.

Foamed plastic materials are preferred base materials, wherein foamed thermoplasts or also foamed thermosets can in particular be used. Advantageous plastic foam materials are thus for example polyethylene terephthalate (PET) foams or polystyrene (PS) foams, as well as more flexible polyethylene (PE) foams or polypropylene (PP) foams or also, as an example of a thermosetting material, polyurethane (PUR) foams. The plastic foam material can be reinforced, i.e. can comprise reinforcing structures embedded in the foam material, or can be used with no reinforcement. The base material is preferably extruded and simultaneously foamed.

In accordance with the invention, the material attenuations are incorporated into the base material by means of cutting or sawing. The word "or" is used here, as elsewhere in accordance with the invention, always in its usual logical sense, i.e. it includes the meaning of "either . . . or" and also the meaning of "and", providing the respective context does not rule out any of these meanings. Accordingly, the material attenuations can be incorporated solely by cutting or solely by sawing or—as corresponds to preferred method embodiments—by a multi-stage process which includes cutting and sawing and preferably consists of cutting and sawing.

In a preferred multi-stage incorporating process, the first stage involves cutting in accordance with the shape of the material attenuations, and after the cutting process, which itself can comprise one or more stages, sawing in accordance with the shape of the material attenuations. The material attenuations are sawn out.

Although the material attenuations can be incorporated in the form of recesses, material attenuations which are shaped as passages, i.e. cavities extending from the upper to the lower side of the reinforcing structure, are preferred, since material attenuations extending through the structure are advantageous with regard to three-dimensional deformability. When manufacturing a composite, the reinforcing structure can be penetrated in the region of the passages by a free-flowing joiner, in order to connect the covering layers of the composite to each other through the reinforcing structure in a material connection.

After the material attenuations have been incorporated, material webs or bridges remain which connect the material cells to each other. After cutting or sawing—preferably, after the final cutting or sawing step—these connecting bridges are compressed, thus permanently reducing their cross-section. The cellular base material is compacted in the region of the bridges. The bridges advantageously fall short of an upper side and lower side of the reinforcing structure, such that when the reinforcing structure is embedded between two covering layers, for example two metallic or plastic covering layers, the bridges do not touch said covering layers. Compacting the bridges by compression is an inexpensive way of making the bridges short of the upper and lower side of the reinforcing structure. When the reinforcing structure is inserted between covering layers of a composite to be manufactured, and the material attenuations are shaped—as is preferred—as passages in the reinforcing structure, the material attenuations form a channel system between the covering layers which extends continuously over the entire area of the reinforcing structure and can accordingly be penetrated by the joiner parallel to the sheet-like reinforcing structure, such that the reinforcing structure is in particular suitable for being filled with joiner by vacuum injection, wherein the joiner can be injected from the side. On the other hand, however, the composite can also be manufactured by placing the reinforcing structure onto one of the covering layers, filling the material attenuations with the joiner, and placing the other of the covering layers onto the reinforcing structure.

In preferred embodiments, the material cells are compacted near the surface and thus rounded on an upper side or a lower side, along at least a part of their edges formed by incorporating the material attenuations. On the one hand, rounding counteracts a notching effect caused by sharp edges, while on the other hand, the area of the material attenuations on the upper side or lower side of the reinforcing structure is increased, which advantageously increases the area available to the joiner for the material connection to the covering layers or at least to one of the covering layers and thus increases the stability of the composite.

The cellular material can be compacted in the region of the bridges or the material cells can be compacted near the surface at ambient temperature, for example room temperature, or in a heated state of the cellular material. A heatable or non-heatable bridge presser for compacting the bridges or a heatable or non-heatable top presser for compacting near the surface, and as applicable for compacting only near the edges of the material cells, can be used. If the cellular material is compacted while warm, it is preferably heated to a temperature just below its melting point and compacted at this temperature.

A preferred manufacturing method includes at least one separating process, namely cutting or sawing, and at least one compacting process, namely compacting the cellular material in the region of the bridges or along the edges of the material cells. In particularly preferred method embodiments, the material attenuations are incorporated sequentially by cutting and then sawing, and at least the bridges are then compacted; more preferably, both cited compacting processes are performed, for example firstly compacting the bridges and then compacting at least the edges of the material cells near the surface. A preferred method therefore comprises at least three stages, more preferably at least four. Proceeding from the cellular base material, the reinforcing structure is preferably manufactured only by cutting or sawing and additionally at least one of the two compacting processes.

For incorporating the material attenuations, it is advantageous if multiple cutting knives or saw blades are arranged on a cutting tool or sawing tool, facing an upper side of the base material, and are moved, for example pushed, into or preferably through the base material by a movement of the tool towards a lower side of the base material. The term "upper side of the base material" here is merely intended to indicate the side of the base material facing the cutting knives or saw blades, and is not intended to state whether the separating tool is arranged vertically above or below the base material, wherein the base material can also be processed in a vertical orientation, with the separating tool then arranged alongside it. If the base material consists of boards, it expediently lies on a support, and the cutting knives or saw blades are pushed from top to bottom into or preferably through the base material.

The cutting knives or saw blades are preferably arranged together in groups, wherein the cutting knives or saw blades of each group respectively produce a material attenuation which—as seen in a top view—is framed by the adjacent material cells and bridges. Within each of the groups, the cutting knives or saw blades of the respective group are arranged close to each other in accordance with the shape of the material cells and attenuations, respectively. For producing hexagonal material cells, each of the groups consists of three cutting knives or saw blades which, within each group, are arranged close to each other in accordance with the angles of the hexagons. In the case of for example square or rhombic material cells, the individual groups would be formed by cutting knives or saw blades arranged crosswise or in the shape of an "X" with respect to each other. In the case of the preferred hexagons, the cutting knives or saw blades of each group are in a Y-shape with respect to each other, in cross-section; in the case of the particularly preferred equilateral hexagons, they are each at an angle of 120° to each other. The cutting knives or saw blades of the individual groups each cut or saw one limb of the material attenuations. Instead of arranging separately produced cutting knives or saw blades into groups of cutting knives or saw blades, the groups can each be formed in one piece.

Preferably, the cutting knives or saw blades are moved, expediently pushed, into or through the base material at least substantially vertically with respect to the surface forming the upper side of the base material; the pushing direction is preferably exactly orthogonal to the surface in question.

In preferred embodiments, the cutting knives or saw blades are only moved in a single plane when cutting or sawing, wherein the cutting or sawing movement is a linear movement in preferred embodiments. The saw blades preferably each exhibit a thickness which corresponds to the width of the material attenuations. If groups are formed, as is preferred, then the saw blades of each group form a cross-section which corresponds to the cross-section of the material attenuations. In such embodiments, the saw blades saw into or preferably through the base material by means of a linear movement or a movement in one plane only, i.e. they are not moved transverse to their pushing direction relative to the base material, in order to produce the material attenuations. Incorporating the material attenuations by means of simply moving the cutting knives or saw blades reciprocally in this way expedites the cutting or sawing process. In preferred embodiments, the cutting knives or saw blades comprise a cutting edge or row of saw teeth which is inclined with respect to the pushing direction. The cutting edge or row of saw teeth preferably extends up to a tip of each cutting knife or saw blade which protrudes in the pushing direction. The cutting process thus involves stabbing and then, while moving the cutting knife in the pushing direction, a cutting engagement with the base material which continues transverse to the pushing direction in the base material. The sawing process proceeds according to the same pattern, but with a sawing engagement between the saw blade and the cellular material instead of the cutting engagement.

When cutting or sawing in batches, the separating tool preferably performs a reciprocal stroke movement composed of the pushing movement into and preferably through the cellular material and the reverse movement.

The separating tool can be fitted with cutting knives or saw blades, preferably groups of cutting knives or groups of saw blades, over its entire area in accordance with the structuring of the reinforcing structure to be provided, such that the cutting or sawing process can be performed in a single stroke for each initial board. In alternative embodiments, the cutting or sawing tool only comprises a beam or other support, from which the cutting knives or saw blades, preferably the groups of cutting knives or groups of saw blades, project alongside each other in a row along a line. During a stroke movement, material attenuations are thus only produced alongside each other on a line, such that the separating tool has to be subsequently moved transverse to the support relative to the initial board and successively incorporates one line of material attenuations after the other. Instead of the tool or as applicable in addition, the initial board can also be moved spatially, in order to incorporate one line of material attenuations after the other.

If the base material is sufficiently flexible that it can be wound onto a reel even without the material attenuations, then incorporating the material attenuations is possible in a continuous method. Such materials, for example PE or PP foams, are unwound in a continuous method embodiment from a reel and guided through a roller gap formed by two rollers rotating opposite to each other or at least by one roller together with a counter-pressure means which is fixed as applicable. The material attenuations are incorporated in the gap. The roller or more preferably at least one roller of the pair of rollers forming the gap is fitted with the cutting knives or saw blades. The rollers or the roller and its counter-pressure means which is formed differently co-operate as a male and female mould. In preferred method embodiments, the web is successively guided through multiple gaps, preferably through at least two gaps, wherein the male mould of one gap is fitted with cutting knives and the female mould of the at least one other gap is fitted with saw blades.

If, as is preferred, the separating process involves at least one cutting process and then at least one sawing process, the base material is preferably fed automatically to the cutting tool and then to the sawing tool, in a batch operation for example by means of a conveyor belt or other form of continuous conveying means, and in a continuous process as a web product which is conveyed through roller gaps arranged sequentially in the conveying direction.

In addition to the manufacturing method, the subject of the invention also includes a reinforcing structure as such, obtained by means of the method in accordance with the invention, and also a composite in a sandwich construction which comprises at least two covering layers and, between the covering layers, an inserted reinforcing structure of the type in accordance with the invention, as well as a joiner which permeates the reinforcing structure and connects it in a material connection to both covering layers, and which is preferably formed by a synthetic resin or an adhesive. The covering layers can in particular be plastic layers or also metal layers, for example light metal layers. The composite can also comprise additional covering layers and additional reinforcing structures, and can in particular be manufactured in a multiple sandwich construction. A double sandwich comprising three covering layers, namely an outer, a middle and another outer covering layer and two reinforcing structures respectively arranged between the outer covering layers and the middle covering layer, may serve as an example. It is also possible to arrange one or more reinforcing structures produced in accordance with the invention, one on top of the other, between covering layers, wherein the lower or lowermost reinforcing structure is adjacent to a lower covering layer, and the upper or uppermost reinforcing structure is adjacent to an upper covering layer.

Preferred features are also disclosed in the sub-claims and combinations of the sub-claims.

An example embodiment of the invention is explained below on the basis of figures. Features disclosed by the example embodiment, each individually and in any combination of features, advantageously develop the subjects of the claims and also the embodiments described above. There is shown:

DETAILED DESCRIPTION OF THE INVENTION

Figure 1:
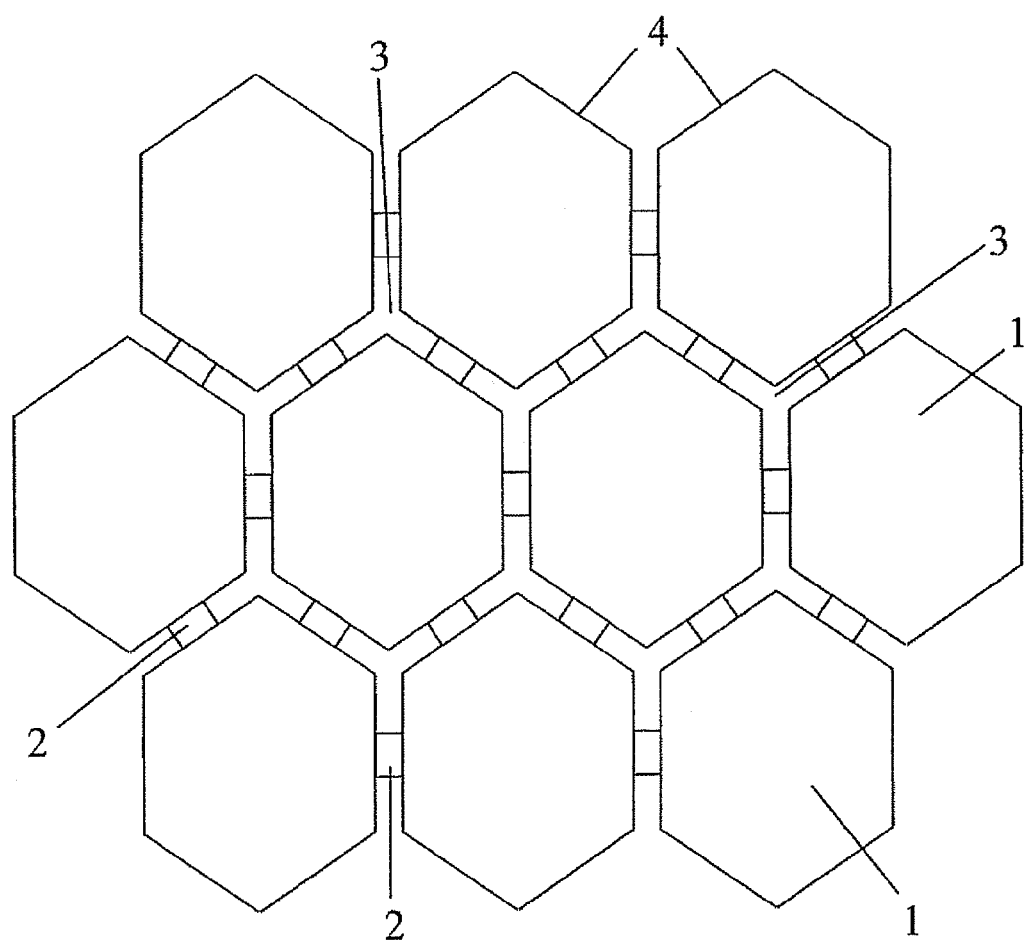
FIG. 1 a reinforcing structure in a top view.

FIG. 1 shows a reinforcing structure made of a cellular material, preferably a plastic foam material. Reinforcing structures, for example filaments, can be embedded in the cellular material, however the cellular material is preferably a non-reinforced cellular material. The reinforcing structure consists of polygonal material cells 1, in the example embodiment hexagonal material cells 1, and relatively thin connecting bridges 2. The material cells 1 are connected on each of their sides to the nearest adjacent material cell 1 via a central connecting bridge 2. Due to their hexagonal shape, each of the material cells 1 is connected to its nearest adjacent material cells 1 via six connecting bridges 2. The width of the material cells 1, as measured in each direction of the plane of view, is clearly larger than the length of the connecting bridges 2. The space between the respectively nearest adjacent material cells 1 is free, apart from the connecting bridges 2. The cavities which thus remain free between the material cells 1 form material attenuations 3 as compared to a non-structured plate-like or mat-like cellular base material. Depending on the bending resistance of the plate-like or mat-like base material, these cavities or material attenuations 3 facilitate—or even at all enable to an appreciable extent—three-dimensional deformability. Primarily, the reinforcing structure 1, 2 can be three-dimensionally deformed, i.e. bent about multiple axes which do not point parallel to each other, by shifting the material cells 1 relative to each other, namely by deforming the connecting bridges 2. The reinforcing structure 1 is therefore suitable as a core material for three-dimensionally curved lightweight composites in a sandwich construction. The material attenuations 3 also in particular enable the penetration of a joiner 17, for example a synthetic resin or adhesive mass, by which two covering layers can be fixedly connected to each other in a material connection via the reinforcing structure 1, 2. The joiner 17 preferably completely fills the spaces remaining free between the material cells 1 in the region of the material attenuations 3 and accordingly forms a honeycombed reinforcing structure for the covering layers in the hardened composite, or if the reinforcing structure 1, 2 is structured differently, forms this predetermined other reinforcing structure.

Figure 2:
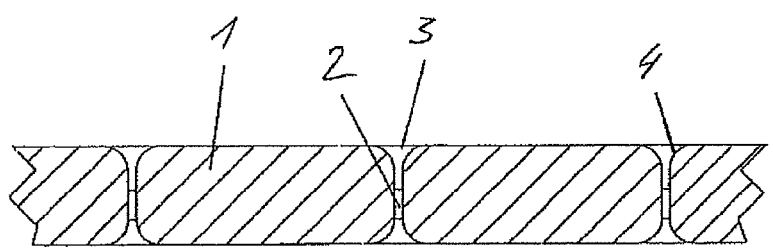
FIG. 2 the reinforcing structure in a cross-section.

FIG. 2 shows the reinforcing structure 1, 2 in a non-deformed initial state in which the reinforcing structure 1, 2 substantially forms a planar mat or plate structured in accordance with the shape of the material cells 1.

Figure 3:
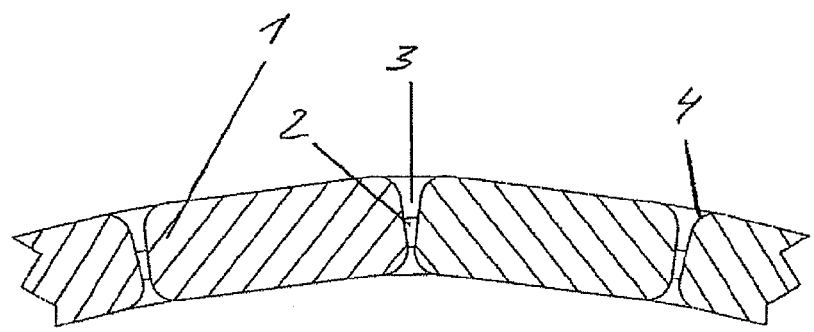
FIG. 3 the deformed reinforcing structure in a cross-section.

FIG. 3 shows the reinforcing structure 1, 2 in a deformed state in which nearest adjacent material cells 1 point at an inclined angle to each other, due to bending in the connecting bridge 2 respectively connecting them.

The reinforcing structure 1, 2 is produced in batches from a plate-like or mat-like cellular base material, an initial board, or continuously from a web material in multiple method steps. The initial board or web product exhibits a material thickness which at least substantially corresponds to the material cells 1 throughout. It is a homogenous, non-structured board or web material which however exhibits a microscopic and as applicable also macroscopic cellular structure having a correspondingly low density. For the example embodiment, it may be assumed that it is a plastic foam material. Such foam materials can in particular be produced by extrusion and separated into the initial boards to be processed, or can be wound onto a reel as a web product if the base material is correspondingly flexible.

The material attenuations 3 are incorporated into such a cellular base material in a multi-stage method by cutting and then sawing. Once the multi-stage separating process—which involves at least one cutting process and at least one sawing process—has been completed, the connecting bridges 2 remaining between the material cells 1 and material attenuations 3 thus obtained are compacted by compression and their cross-section thus reduced, such that the compacted bridges 2 fall short of both the upper side and the lower side of the material cells 1, as can for example be seen in FIGS. 2 and 3. The bridges 2 can be compacted with or without being heated. Reducing the cross-section of the bridges 2 by compression represents a method which is simple and therefore inexpensive to perform mechanically and which provides contact areas for the joiner 17 to the respective covering layer of the composite in the region of the material attenuations 3.

Before the bridges 2 are compacted or more preferably after the bridges 2 have been compacted, or as applicable at the same time as the bridges 2 are compacted, the material cells 1 are compacted by means of compression in a near-surface range of depth on each of the upper side and lower side, in order to round the edges of the material cells 1 which are still sharp-edged after the separating process. In FIGS. 1 to 3, the already rounded edges are provided with the reference sign 4. The material cells 1 can also either be heated at least in their near-surface range of depth to support compacting this material, or can also be compacted at ambient temperature, by means of pressure only. On the one hand, rounding the edges 4 prevents notching effects and on the other hand advantageously increases the contact area available to the joiner 17 to the covering layer of the composite situated on the respective upper or lower side of the reinforcing structure 1, 2.

Figure 4:
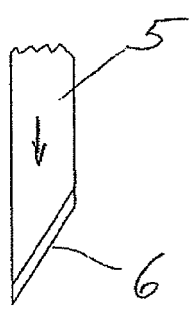
FIG. 4 a cutting knife.
Figure 5:
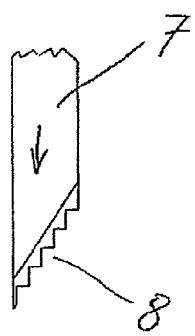
FIG. 5 a saw blade.
Figure 4A:
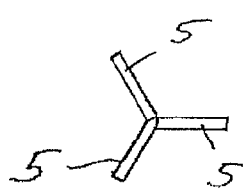
FIG. 4a a group of cutting knives, in a view from below.
Figure 5A:
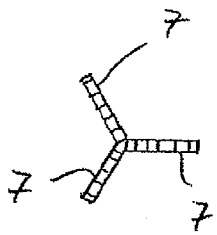
FIG. 5a a group of saw blades, in a view from below.

FIGS. 4 and 5 respectively show a cutting knife 5 and a saw blade 7 in a lateral view. For incorporating the material attenuations 3, a plurality of cutting knives 5 are arranged on a cutting tool and an equal plurality of saw blades 7 are arranged on a sawing tool. The cutting tool can for example be formed by a cutting beam on which the cutting knives 5 are arranged, projecting from the cutting beam towards the base material to be processed. The sawing tool can similarly comprise such a sawing beam for the saw blades 7 which are arranged on the sawing beam, projecting towards the base material. The cutting knives 5 and the saw blades 7 are arranged on the respective tool in groups of three, each consisting of three cutting knives 5 or saw blades 7 which point in a Y-shape with respect to each other, as shown in the views from below in FIGS. 4a and 5a. The respective tool can be moved back and forth in a pushing direction which is indicated on the cutting knife 5 and saw blade 7 by a directional arrow, such that in the respective stroke movement, the cutting knives 5 of the cutting tool or saw blades 7 of the sawing tool are pushed towards and through the base material in the pushing direction. The cutting knives 5 each comprise a tip protruding in the pushing direction and, inclined from this with respect to the pushing direction—in the example embodiment, inclined at a constant angle of inclination—a cutting edge 6 comparable to a guillotine, such that the cutting knives 5 stab into the base material with their tip first and then continue to cut through along the respective cutting edge 6, in order to obtain an even cut.

The sawing process is performed after cutting, wherein the saw blades 7 are positioned exactly opposite the incorporated cuts and then moved in the plotted pushing direction relative to the initial material provided with the cuts. The saw blades 7 are moved forwards along the cuts. They likewise comprise a tip at their protruding ends in the pushing direction, comparable to the cutting knives 5, from which a row of saw teeth 8 inclined with respect to the pushing direction tapers off counter to the pushing direction, comparable to the cutting edge 6. As a first approximation, the effect of the saw blades 7 is comparable to a jig or sabre saw, however due to the inclined row of saw teeth 8, a force acting in the pushing direction is sufficient in order to widen the previously produced cut by a sawing process continuing from the respective tip of the saw blade towards a respectively nearest adjacent connecting bridge 2 or continuing away from a respectively nearest adjacent connecting bridge 2. During sawing, the material attenuation 3 is widened in accordance with the thickness of the saw blades 7, in particular the thickness of the rows of saw teeth 8.

The cutting knives 5 exhibit a width of preferably at least 300 μm and preferably at most 800 μm. The saw blades 7 preferably exhibit a larger width of preferably at least 400 μm and preferably at most 2 mm.

Figure 6:
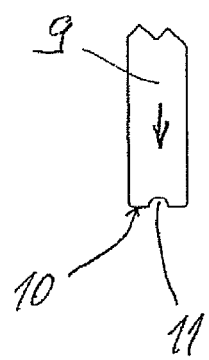
FIG. 6 a bridge presser.

FIG. 6 illustrates a bridge presser 9 using which one of the bridges 2 can be compressed and thus compacted after cutting and sawing, such that the cross-section of the bridge 2 in question is permanently reduced. On a lower side 10, via which it presses against the bridge 2 during compression, the bridge presser 9 comprises a central recess 11. The recess 11 is semi-cylindrical—in the example embodiment, semi-circular cylindrical—and extends over the entire lower side 10. The compacted bridge 2 comes to rest in the recess 11 at the end of the compacting stroke. The bridges 2 are each compressed by means of two bridge pressers 9, one of which faces and opposes the upper side of the reinforcing structure 1, 2 and the other of which faces and opposes the lower side of the reinforcing structure 1, 2. The bridge pressers 9 are moved towards each other in pairs—as applicable, one of the bridge pressers 9 can remain at rest while only the other one is moved—until the bridge 2 in question has been compacted to the desired final shape. The movement direction of the bridge presser 9 is indicated by a directional arrow. In a preferred embodiment, bridge pressers 9 project from a forming tool in a number and arrangement which corresponds to the number and arrangement of the bridges 2 to be compacted. Another such forming tool is arranged facing the other side of the reinforcing pre-structure produced by cutting and sawing. The bridge pressers 9 each exhibit a thickness which at least substantially corresponds to the length of the bridges 2.

Figure 7:
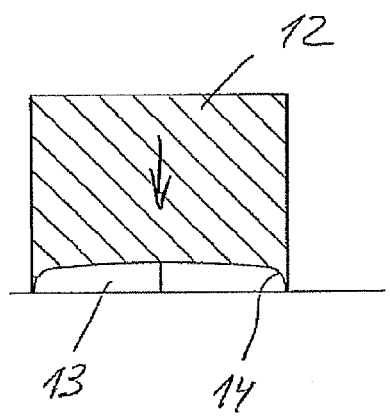
FIG. 7 a top presser.

FIG. 7 shows a top presser 12 by means of which one of the material cells 1 is compacted on its upper side or lower side by compression, wherein the material cell 1 is primarily compacted along the edges 4 obtained by sawing, wherein the edge 4 in question is primarily rounded. The top presser 12 comprises a hollow space 13 on its lower side facing the reinforcing structure 1, 2. The hollow space 13 is trough-shaped. During compression, it accommodates the upper or lower side of one of the material cells 1. At its circumferential edge, the hollow space 13 tapers out in a curve, the shape of which corresponds to the desired curve for the edges 4 of the material cells 1. A forming tool is arranged facing each of the upper side and lower side of the reinforcing structure 1, 2 and is provided with a number of top pressers 12 corresponding to the number and shape of the material cells 1. In this forming step, the material cells 1 are compressed between the top pressers 12 of the two tools and thus compacted near the surface, at least in the region of the edges 4.

The reinforcing structure 1, 2 can be produced from an initial board made of the cellular base material in a batch process as follows:

As already mentioned, the cutting knives 5 are arranged on the cutting tool along a support of the tool in groups of three cutting knives 5 each, wherein the cutting knives 5 of each group of three are arranged in a Y-shape with respect to each other. The saw blades 7 are correspondingly arranged along a support of the sawing tool. Initial boards of the cellular material are conveyed through successively and in steps, below the cutting tool and the sawing tool. In each stroke movement of the cutting tool, the cutting knives 5 produce one cut in the region of the material attenuations 3 to be provided. The cut regions are then sawn out by means of a stroke movement of the sawing tool and the saw blades 7 projecting from it.

The boards respectively provided after these processes as reinforcing pre-structures are conveyed to the forming tool comprising the bridge pressers 9, where the bridges 2 are compacted. In the final step, the edges 4 of the material cells 1 are rounded by means of another forming tool bearing a plurality of top pressers 12. In a variant, the order of the two compacting operations can be reversed. It is also possible to compact the bridges 2 and round the edges 4 of the material cells 1 at the same location, and as applicable at the same time. In such embodiments, a combined forming tool comprises both the bridge pressers 9 and the top pressers 12, wherein the bridge pressers 9 can be moved in the compressing direction relative to the top pressers 12. The bridges 2 and material cells 1 can be compacted while cold, at ambient temperature. In a further development, the bridge pressers 9 are tempered to a temperature slightly below the melting point of the cellular base material. In another further development, the top pressers 12 are tempered to such a temperature. It is also possible to correspondingly temper the bridge pressers 9 and the top pressers 12.

Figure 8:
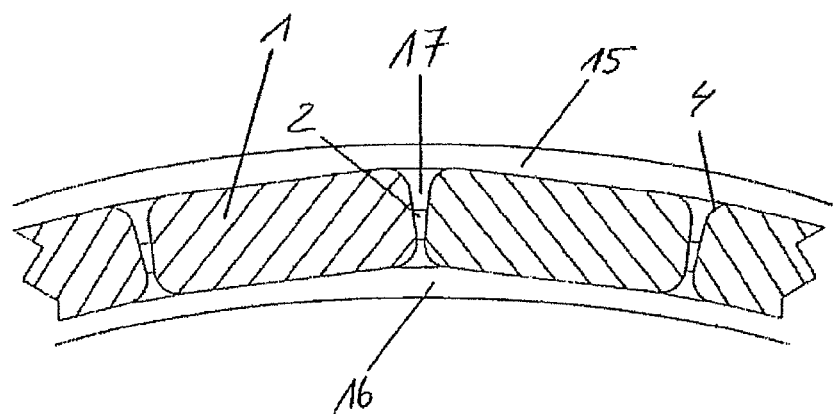
FIG. 8 a composite.

FIG. 8 shows a composite comprising an upper covering layer 15 and a lower covering layer 16, each consisting of a plastic material. The reinforcing structure 1, 2 is sandwiched between the covering layers 15 and 16. The material attenuations 3 are filled with a joiner 17, preferably a hardened resin. The joiner 17 conforms to the honeycombed structure of the material cells 1 and fills the former material attenuations 3.

The invention is:

1. A method for manufacturing a three-dimensionally deformable, sheet-like reinforcing structure, comprising:
   incorporating material attenuations into a sheet-like, cellular base material, distributed over an area of the base material, by cutting or sawing,
   said material attenuations sub-dividing the base material into a plurality of material cells said material cells delineated from each other by said material attenuations but are still connected to each other, wherein the material attenuations are incorporated in such a way that one or more bridges remain between adjacent material attenuations and connect adjacent material cells to each other;
   wherein a cross-sectional area of said bridges is reduced by compression;
   wherein said bridges are compacted, such that said bridges fall short of an upper side and a lower side of said adjacent material cells:
   wherein the material cells are compacted near the surface and thus rounded on an upper side or a lower side, along at least a part of edges formed by incorporating the material attenuations; and
   wherein the material cells are heated at least in the region of the edges to be rounded, and are compacted near the surface along the heated edges.

2. The method according to claim 1, wherein the cross-sectional area of the bridges is reduced by heating and compressing the heated bridges.

3. The method according to claim 1, wherein cutting involves stabbing which preferably penetrates through the base material.

4. The method according to claim 1, wherein sawing involves jig or sabre sawing which preferably penetrates through the base material.

5. The method according to claim 1, wherein the material attenuations are incorporated by cutting and then sawing.

6. The method according to claim 5, wherein cutting is performed in a cutting plane, and sawing is performed in the same cutting plane.

7. The method according to claim 1, wherein the material attenuations are produced in the base material in the form of recesses or preferably passages, by cutting or sawing.

8. The method according to claim 1, wherein cutting is performed using cutting knives or sawing is performed using saw blades which are only moved in a single cutting or sawing plane when incorporating the material attenuations.

9. The method according to claim 1, wherein the material attenuations are sawn using saw blades which exhibit a thickness which corresponds to a width of the material attenuations.

10. The method according to claim 1, wherein in order to incorporate the material attenuations, cutting knives of a cutting tool or saw blades of a sawing tool facing an upper side of the base material are moved into or through the base material towards a lower side of the base material.

11. The method according to claim 9, wherein the cutting knives each comprise a cutting edge which is inclined with respect to the movement direction, or the saw blades each comprise a row of saw teeth which is inclined with respect to the movement direction.

12. The method according to claim 11, wherein the cutting knives or saw blades comprise a tip protruding in the movement direction.

13. The method according to claim 1, wherein plastic foam material is used as the base material, in which reinforcing structures are optionally embedded.

14. A method for manufacturing a three-dimensionally deformable, sheet-like reinforcing structure, comprising:
   providing a base material having an upper surface and a lower surface removing portions of said base material from said upper surface to said lower surface to define a plurality of cells interconnected by one or more bridges;
   compressing said one or more bridges relative to at least one of said upper surface and said lower surface of said plurality of cells, wherein said one or more bridges are inwardly spaced from at least one of said upper surface and said lower surface of said plurality of cells;

wherein at least some of said plurality of cells are compacted near said upper surface or said lower surface and thus rounded on an upper side or a lower side, along at least a part of edges formed by removing said portions of said base material; and wherein at least some of said plurality of cells are heated at least in the region of the edges to be rounded, and are compacted near said upper surface or said lower surface along the heated edges.

15. The method according to claim 14, wherein said one or more bridges are compressed relative to each one of said upper surface and said lower surfaces of said plurality of cells.

* * * * *